(12) United States Patent
McDonough

(10) Patent No.: US 6,763,301 B2
(45) Date of Patent: *Jul. 13, 2004

(54) METHOD AND SYSTEM FOR COMPACT REPRESENTATION OF ROUTES

(75) Inventor: William McDonough, Glen Ellyn, IL (US)

(73) Assignee: Navteq North America, LLC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,295

(22) Filed: Feb. 24, 2003

(65) Prior Publication Data

US 2003/0130789 A1 Jul. 10, 2003

Related U.S. Application Data

(63) Continuation of application No. 09/649,715, filed on Aug. 25, 2000, now Pat. No. 6,526,348.

(51) Int. Cl.$^7$ .............................................. G01C 21/30
(52) U.S. Cl. ...................... 701/208; 701/25; 701/209; 707/100; 342/357.13; 340/995.18
(58) Field of Search ...................... 340/995.1, 995.14, 340/995.18; 382/276, 173, 232, 305; 701/208, 209, 211, 212, 25; 342/357.13; 707/1, 100, 101, 102, 104.1, 103 R

(56) References Cited

U.S. PATENT DOCUMENTS

| | | | |
|---|---|---|---|
| 5,648,769 A | 7/1997 | Sato et al. ................... 340/988 |
| 5,648,901 A | 7/1997 | Gudat et al. ................... 701/23 |
| 5,699,255 A | 12/1997 | Ellis et al. ................... 701/212 |
| 5,884,218 A | 3/1999 | Nimura et al. .............. 701/208 |
| 5,926,118 A | 7/1999 | Hayashida et al. ..... 340/995.21 |
| 5,953,722 A | * 9/1999 | Lampert et al. ............. 707/100 |
| 5,983,158 A | 11/1999 | Suzuki et al. ............... 701/209 |
| 6,018,697 A | 1/2000 | Morimoto et al. .......... 701/209 |
| 6,047,235 A | 4/2000 | Hiyokawa et al. .......... 701/201 |
| 6,058,350 A | 5/2000 | Ihara .......................... 701/208 |
| 6,101,443 A | 8/2000 | Kato et al. .................. 701/210 |
| 6,107,944 A | 8/2000 | Behr et al. ............. 340/995.12 |
| 6,184,823 B1 | * 2/2001 | Smith et al. ........... 342/357.13 |
| 6,192,314 B1 | 2/2001 | Khavakh et al. ............ 701/209 |
| 6,249,740 B1 | 6/2001 | Ito et al. ..................... 701/200 |
| 6,473,770 B1 | * 10/2002 | Livshutz et al. ......... 707/103 R |
| 6,526,348 B1 | * 2/2003 | McDonough ............... 701/209 |
| 6,600,841 B1 | * 7/2003 | Friederich et al. .......... 382/305 |
| 2002/0161513 A1 | * 10/2002 | Bechtolsheim et al. ..... 701/208 |

* cited by examiner

Primary Examiner—Jacques H. Louis-Jacques
(74) Attorney, Agent, or Firm—Frank J. Kozak; Jon D. Shutter; Lawrence M. Kaplan

(57) ABSTRACT

A method for representing a route along a road network in a geographic region is disclosed. A database includes data representations of intersections of roads in the geographic region. Associated with the data representation for each intersection of roads are data indicating one or more nominal paths through the intersection. The nominal paths through an intersection identify, for each road segment by which the represented intersection can be entered, one and only one road segment from which the represented intersection is exited. The route is represented by indicating each intersection at which the route deviates from the nominal path into the intersection.

9 Claims, 14 Drawing Sheets

ACTUAL INTERSECTION

ACTUAL INTERSECTION

ACTUAL INTERSECTION

ACTUAL INTERSECTION

ACTUAL INTERSECTION

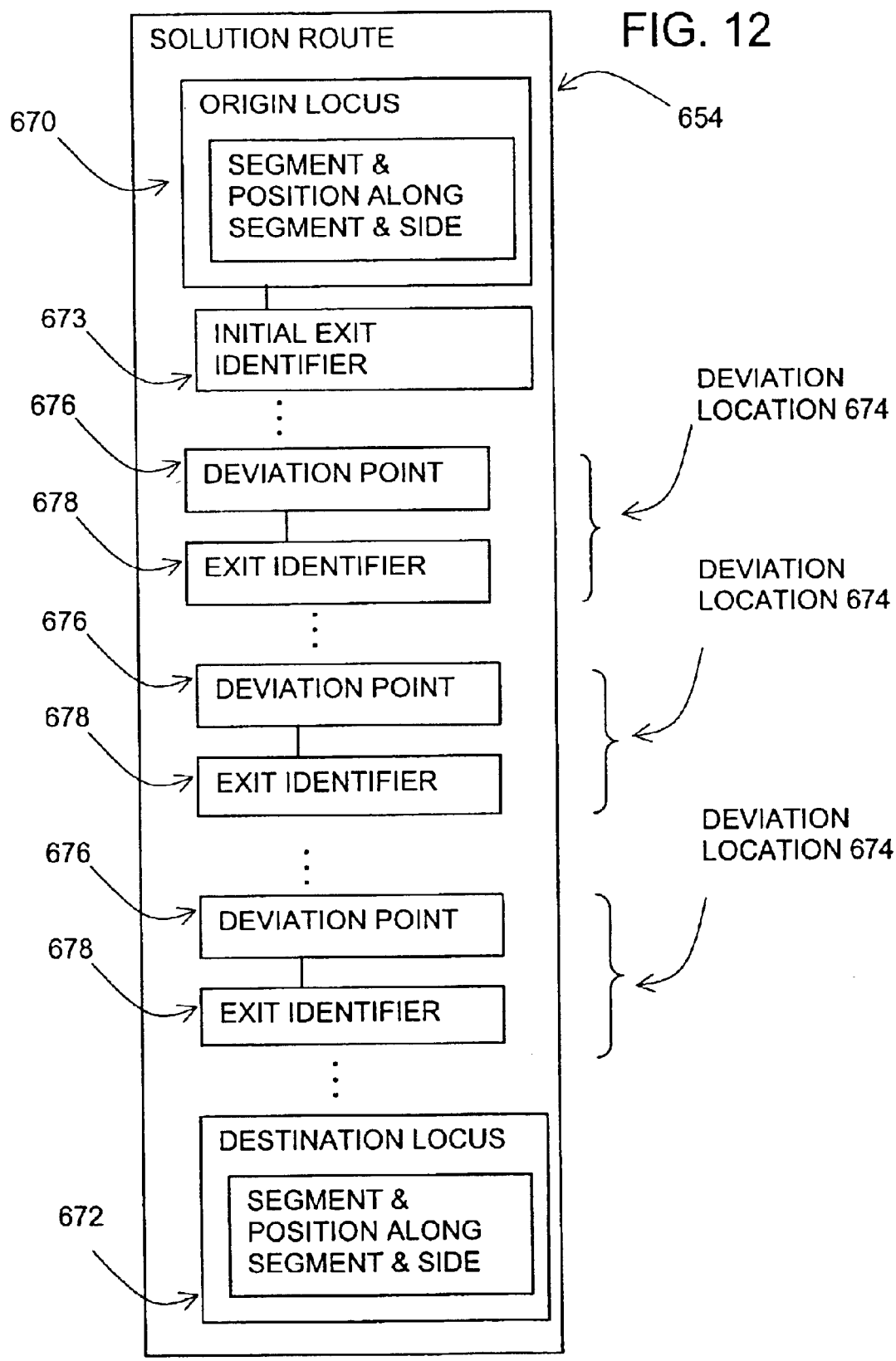

METHOD AND SYSTEM FOR COMPACT REPRESENTATION OF ROUTES

REFERENCE TO RELATED APPLICATION

The present application is a continuation of Ser. No. 09/649,715, filed Aug. 25, 2000, now U.S. Pat. No. 6,526,348, the entire disclosure of which is incorporated herein by reference.

BACKGROUND OF THE INVENTION

The present invention relates to navigation systems and more particularly the present invention relates to ways to represent routes that reduces the amount of data required to fully represent the route for the navigation system.

Navigation systems provide useful features, such as calculating routes to desired destinations and then providing guidance for following the routes. When a navigation system calculates a route to a desired destination, route calculation programming in the navigation system attempts to determine one or more solution routes between a starting location and a destination location. A solution route is formed of a series of connected road segments over which a vehicle can travel from the starting location to the destination location. The solution route calculated by the route calculation programming conforms to known traffic restrictions, such as one-way street restrictions and turn restrictions at intersections. When the route calculation programming in a navigation system calculates a solution route, it accesses a geographic database to obtain data that represent road segments and intersections around and between the starting location and the destination location. The data in the geographic database include information about the locations of roads and intersections, estimated travel times along road segments, the speed limits along roads, turn restrictions, etc. Using these kinds of geographic data, the route calculation programming in navigation systems can find an optimal (e.g., fastest or shortest) route to a specified destination. In one embodiment, the output of the route calculation programming is in the form of an ordered list identifying a plurality of road segments. The plurality of road segments form the continuous navigable route between the origin and the destination that had been calculated by the route calculation programming in the navigation system. The ordered list of road segments is used by the route guidance programming to provide the navigation system user with driving instructions for following the calculated route.

The method described above for representing calculated routes works well for various types of routes and for various types of navigation systems. A consideration associated with the described method for representing routes is that routes that contain a relatively large number of road segments, such as long routes, require a correspondingly large amount of the memory to represent. Although many navigation systems have ample memory resources, some navigation system platforms have relatively small amounts of memory. On navigation system platforms that have relatively small amounts of memory, a long route that has a large number of road segments may occupy a relatively large portion of the memory resources of the navigation system thereby possibly affecting performance.

Another consideration associated with representing a route relates to navigation systems in which a route is calculated at a central location and then data representing the calculated route are transmitted wirelessly to an in-vehicle navigation guidance system that provides the driver with instructions for following the route. With a system in which data representing a route are transmitted wirelessly, a long route having a large number of road segments would require that a relatively large amount of data be transmitted wirelessly thereby requiring that the wireless data transmission system have sufficiently large capacity.

Accordingly, there exists a need to represent routes in a way that reduces the amount of data required to represent the route.

SUMMARY OF THE INVENTION

To address these and other objectives, the present invention comprises a method for representing a route along a road network in a geographic region. A database includes data representations of intersections of roads in the geographic region. Associated with the data representation for each intersection of roads are data indicating one or more nominal paths through the intersection. The nominal paths through an intersection identify, for each road segment by which the represented intersection can be entered, one and only one road segment from which the represented intersection is exited. The route along the road network in the geographic region is represented by indicating each intersection at which the route deviates from the nominal path into the intersection.

According to another aspect, the present invention comprises a geographic database including nominal path data associated with represented intersections.

According to another aspect, the present invention comprises a navigation system that uses nominal path data to represent routes.

According to another aspect, the present invention comprises a method for forming a database that includes nominal path data associated with represented intersections.

BRIEF DESCRIPTION OF THE DRAWINGS

FIG. 12 is a diagram showing components of the output of the route calculation application in FIG. 11.

DETAILED DESCRIPTION OF THE
PRESENTLY PREFERRED EMBODIMENTS

I. Forming Geographic Database

A. Overview

Figure 1:
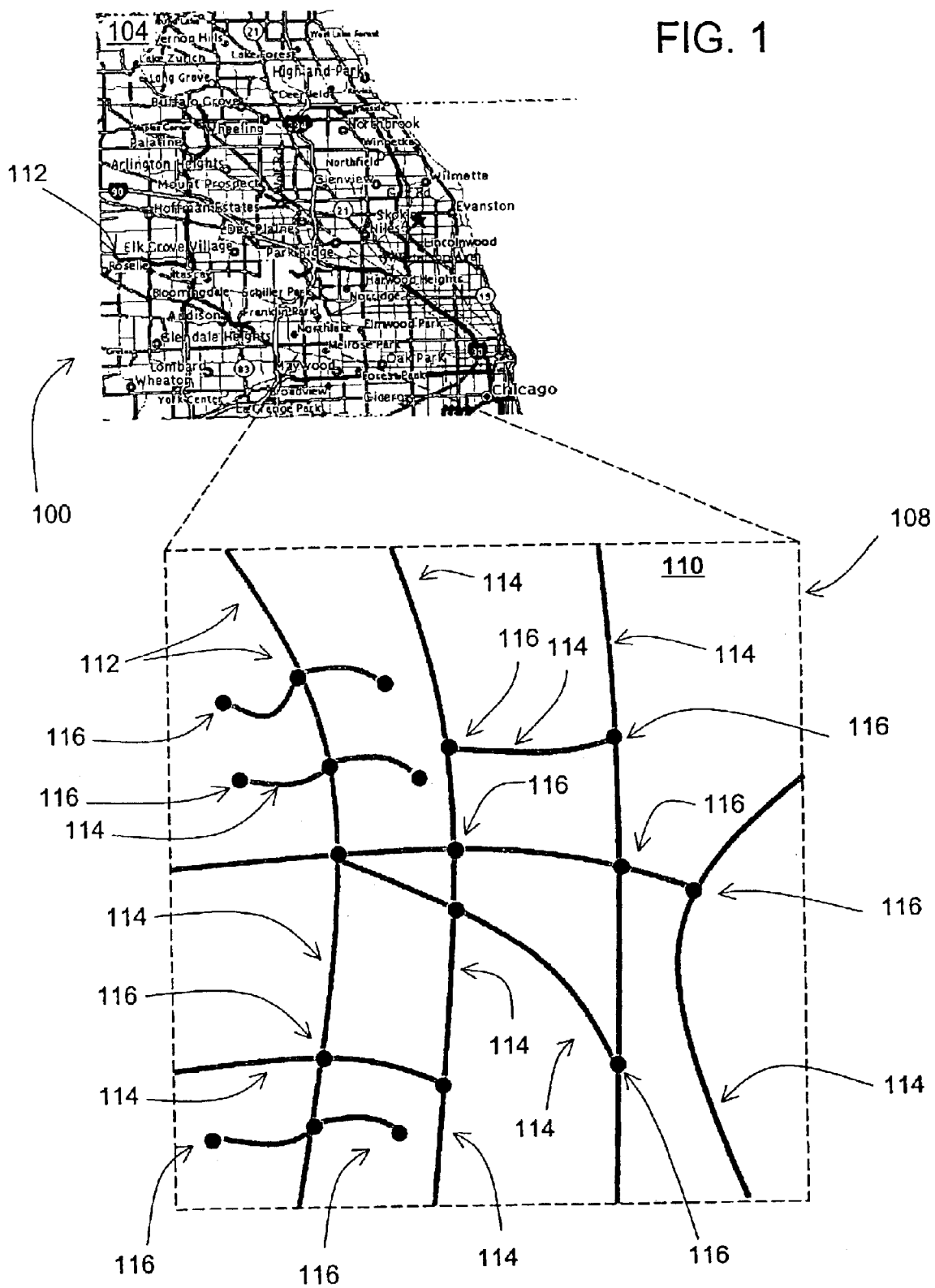
FIG. 1 illustrates a map of a geographic region including an expanded view of a portion of the geographic region.

FIG. 1 shows a map 100 of a geographic region 104. A road network 112 is located in the geographic region 104. The road network 112 includes, among other things, roads and intersections located in the geographic region 100. FIG. 1 also shows an expanded view 108 of a portion 110 of the geographic region 104 including an expanded view of a portion of the road network 112.

As illustrated in the portion 110, each road in the geographic region 104 is composed of one or more road segments 114. Each road segment 114 has associated with it two nodes 116, one node represents the point at one end of the road segment and the other node represents the point at the other end of the road segment. The node at either end of a road segment may correspond to a location at which the road meets another road, e.g., an intersection, or where the road dead ends.

Figure 2:
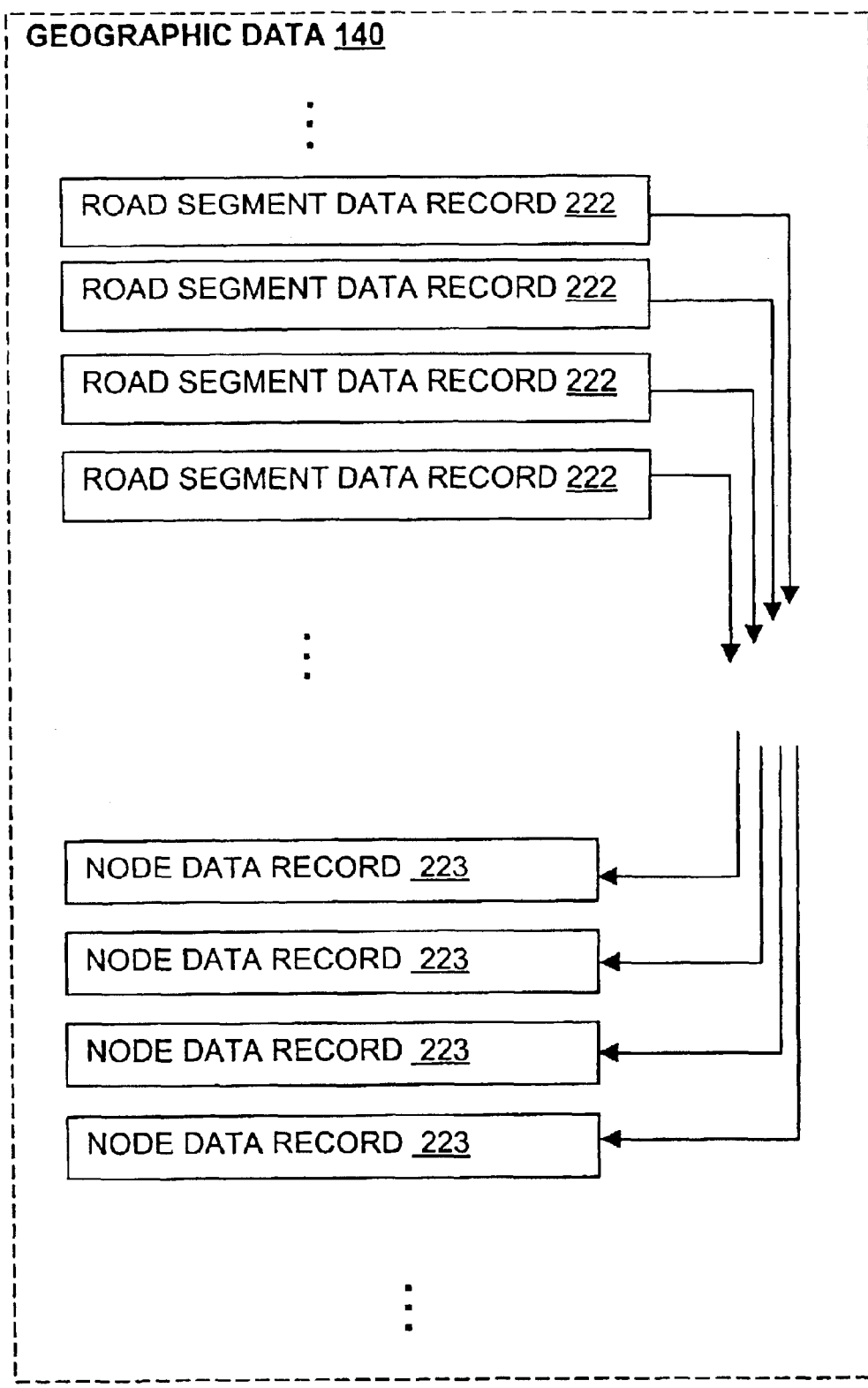
FIG. 2 is a diagram illustrating components of a geographic database that represents the road network of FIG. 1.
Figure 3:
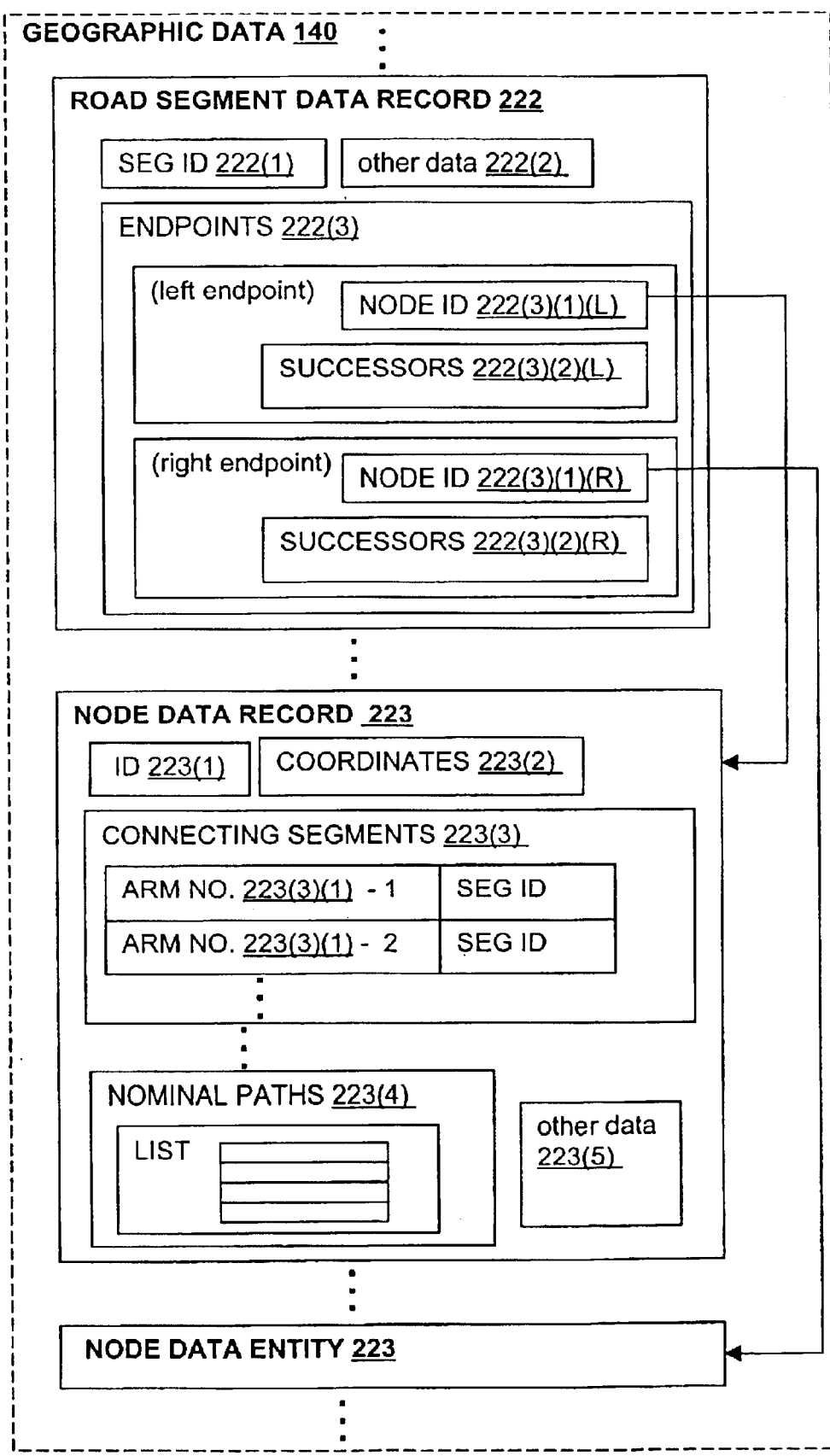
FIG. 3 is a block diagram illustrating components of a road segment data record and a node data record included in the geographic database of FIG. 2.

In one type of geographic database used in navigation systems, there is at least one database entry (also referred to as an "entity" or "record") for each road segment located in a geographic region. FIG. 2 shows a geographic database 140 having a plurality of road segment data records 222. FIG. 3 illustrates some of the components of one of the road segment data records 222. As shown in FIG. 3, the road segment data record 222 has an ID 222(1) that identifies the record in the database. The geographic road segment data record 222 has various data 222(2) (such as "attributes", "fields", etc.) associated with it. These data 222(2) may indicate the speed of travel on the portion of the road represented by the road segment record, the direction of travel permitted on the road portion represented by the road segment record, the street address ranges of the road portion represented by the road segment record, the name of the road, and so on. The various attributes associated with a road segment may be included in a single road segment record or may be included in more than one type of record which are cross-referenced to each other.

Referring to FIG. 2, the geographic database 140 also includes an entry (i.e., an entity or record) 223 for each node in the geographic region. FIG. 3 illustrates some of the components of a node data record 223. The node data record 223 has an ID 223(1) that identifies the record in the database. The node data record 223 has information associated with it (such as "attributes", "fields"). The node data record 223 includes data 223(2) that identify its geographic position (e.g., its latitude and longitude coordinates). The node data record 223 also includes data 223(3) indicating which road segments meet at the represented node. Each road segment that meets at a node is assigned an arm number 223(3)(1). The arm number 223(3)(1) may be arbitrarily assigned. One way of assigning arm numbers is to assign a number to each connected road segment in order (e.g., clockwise) starting with the connected road segment with the lowest azimuth (i.e., from an arbitrarily defined direction, such as north). In one embodiment, each road segment connected to a node is assigned an arm number regardless of whether traffic is legally permitted to travel onto the road segment.

The node data record 223 also includes data 223(4) indicating nominal paths through the represented node. (The data 223(4) indicating the nominal paths are described in more detail below.) The node data record 223 may also include other data 223(5).

Referring again to the road segment data record 222 in FIG. 3, the road segment data record 222 includes endpoint data 222(3). The endpoint data 222(3) include information about the endpoints of the represented road segment. The endpoint data 222(3) include data that indicates the locations of the endpoints of the represented road segment. The endpoint data 222(3) may indicate the locations of the endpoints in various different ways. According to one embodiment, the endpoint data 222(3) include references 222(3)(1)(L) and 222(3)(1)(R) to the node data records 223 that represent the nodes corresponding to the endpoints of the represented road segment. The endpoint data 222(3) may also include successor data 222(3)(2)(R) and 222(3)(2)(L). The successor data 222(3)(2)(R) and 222(3)(2)(L) indicate which other road segments (i.e., successor road segments), if any, connect to each endpoint of the represented road segment. The successor data 222(3)(2)(R) and 222(3)(2)(L) may indicate which of these successor road segments are legally accessible from the represented road segment via each endpoint and which other road segments connect to the represented road segment at each endpoint, but are not legally accessible.

B. Nominal Paths

As mentioned above, each node record 223 includes data 223(4) indicating nominal paths through the represented node. The nominal path data 223(4) are comprised of a list of nominal paths. The list of nominal paths includes a path for each legal entrance road segment to the associated node. A legal entrance road segment is that road segment along which travel to the node is legally permitted. Thus, if four road segments connect to a node and travel to the node along each of the road segments is legally permitted, the nominal path data is comprised of a list indicating four nominal paths, one for each of the four legal entrance road segments. Alternatively, if two one-way streets intersect at a node, the nominal path data 223(4) are comprised of a list having two nominal paths, one for each of the two legal entrance road segments along which travel to the node is legally permitted.

Each nominal path indicates one, and only one, exit road segment. The exit road segment for a nominal path is that road segment onto which travel is most likely to occur from the associated entrance road segment via the associated node.

The nominal path data 223(4) may identify each entrance segment and exit segment by using segment IDs (222(1) in FIG. 3). Alternatively, the nominal path data 223(4) may identify each entrance segment and exit segment by using arm number data 223(3)(1). The nominal path data 223(4) may identify each entrance segment and exit segment by other means.

When collecting data for a geographic database, data may be collected that determines the most likely exit road segment for each entrance road segment. Alternatively, the most likely exit road segment may be estimated from the road geometry.

Nominal path data for several different types of nodes are described in the following examples.

EXAMPLE 1

Figure 4A:
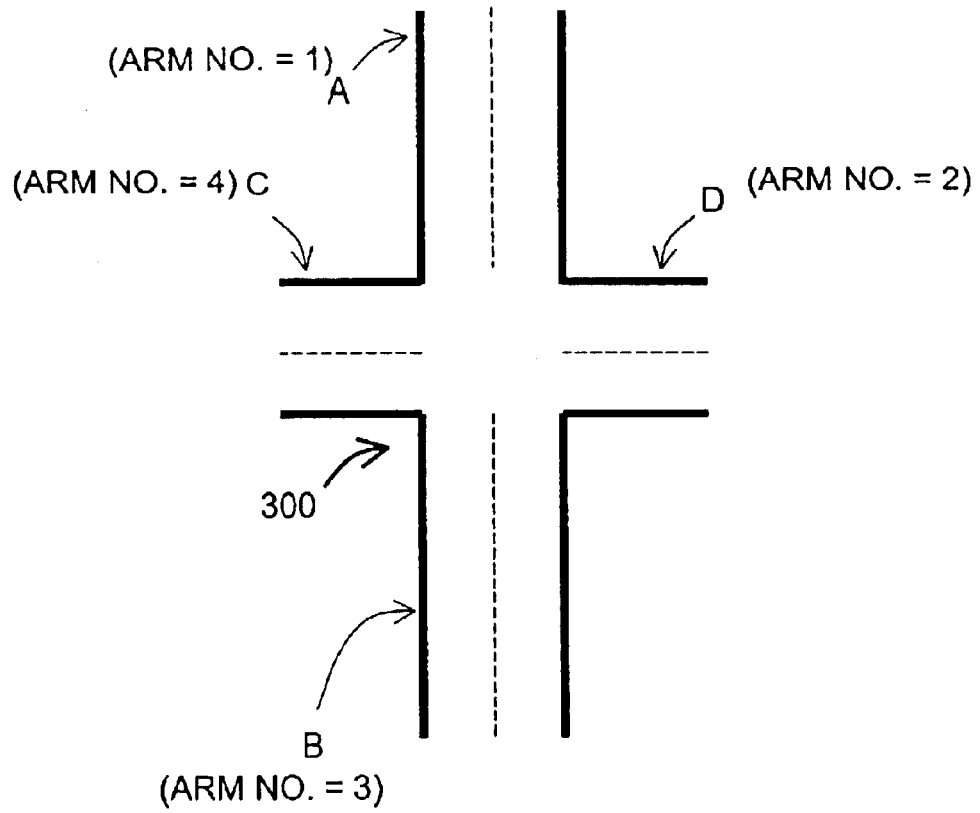
FIG. 4A is an illustration of one type of intersection.
Figure 4B:
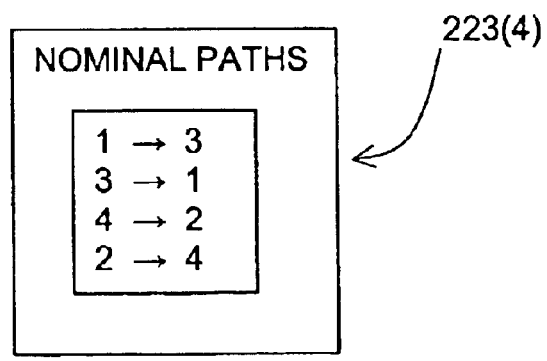
FIG. 4B is a diagram that illustrates the nominal path data included in a node data record that represents the intersection shown in FIG. 4A.

FIG. 4A shows an intersection 300. The road segments labeled A, B, C, and D, all meet at the intersection 300. Travel in both directions is permitted on the road segments labeled A, B, C, and D. FIG. 4B shows the nominal path data 223(4) for the node data record that represents the intersection 300. The nominal path data 223(4) include four paths, one for each of the road segments along which travel to the represented node is permitted. In the case of the intersection 300, it is most likely that a person entering the intersection will travel straight through. Therefore, the nominal paths are A to B, B to A, C to D and D to C. Data indicating these nominal paths are included in the nominal path data 223(4) for the node data record that represents this intersection 300. In FIG. 4B, the arm number data are used to identify the entrance and exit segments of each nominal path.

EXAMPLE 2

Figure 5A:
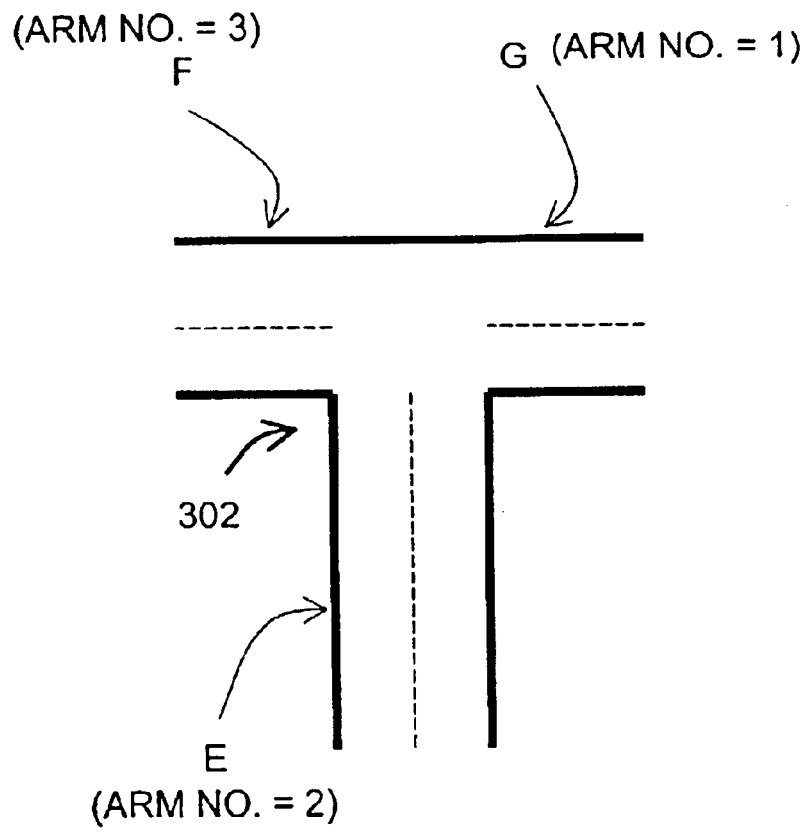
FIG. 5A is an illustration of another type of intersection.
Figure 5B:
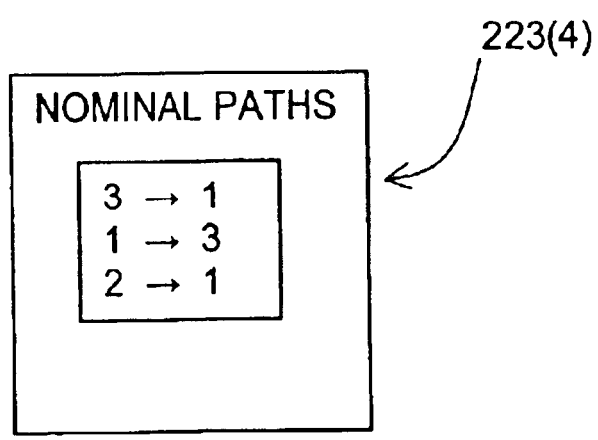
FIG. 5B is a diagram that illustrates the nominal path data included in a node data record that represents the intersection shown in FIG. 5A.

FIG. 5A shows an intersection 302. The road segments labeled E, F, and G, all meet at the intersection 302. Travel in both directions is permitted on the road segments labeled E, F, and G and there are no turn restrictions. FIG. 5B shows the nominal path data 223(4) for the node data record that represents the intersection 302. The nominal path data 223(4) include three paths, one for each of the road segments along which travel to the represented node is permitted. In the case of the intersection 302, it is most likely that a person entering the intersection along the road segment labeled F will travel straight through to the road segment labeled G and that a person entering the intersection along the road segment labeled G will travel straight through to the road segment labeled F. A person entering the intersection along the road segment labeled E will likely turn right onto the road segment labeled G. (This determination may be based on actual collection of data or by assumption based on road geometry, e.g., a motorist is more likely to turn right than left.) Therefore, the nominal paths are F to G, G to F, and E to G. Data indicating these nominal paths are included in the nominal path data 223(4) for the node data record that represents the intersection 302. In FIG. 5B, the arm number data are used to identify the entrance and exit segments of each nominal path.

EXAMPLE 3

Figure 6A:
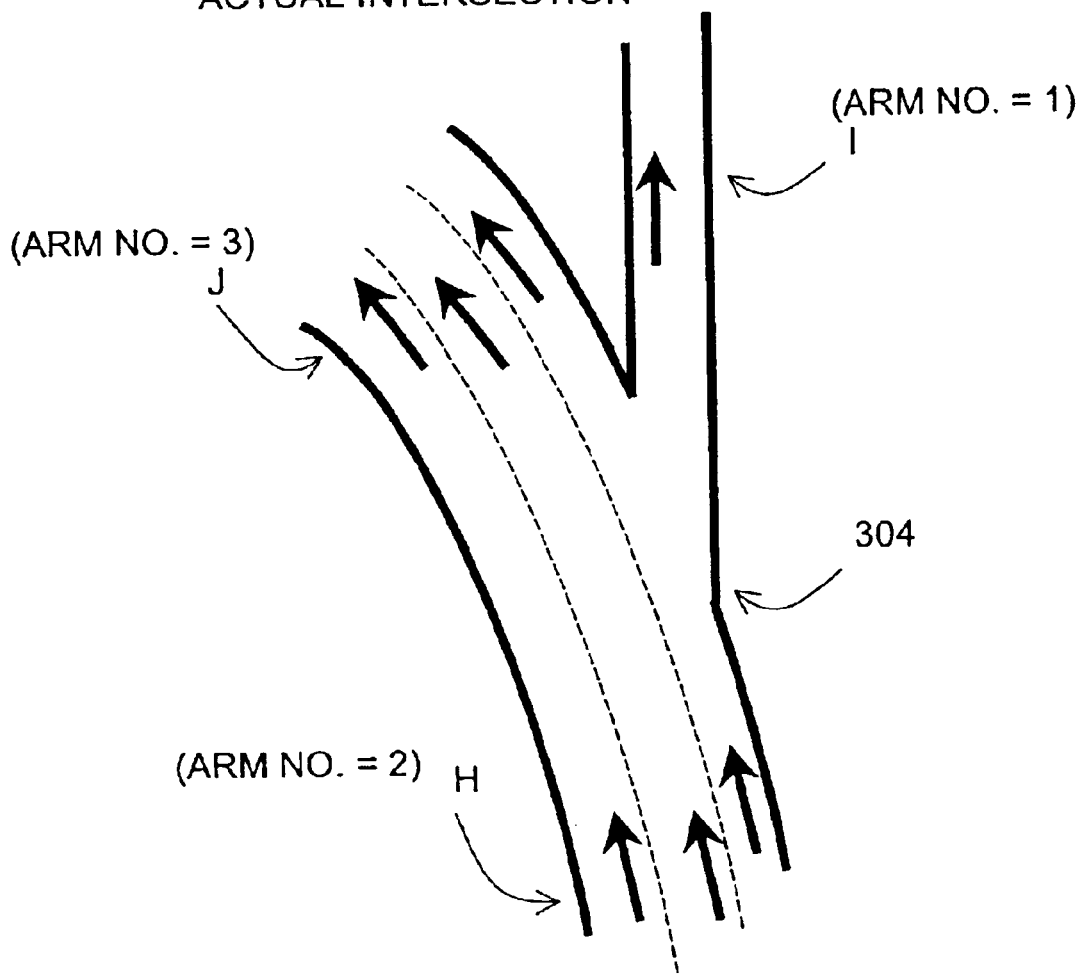
FIG. 6A is an illustration of still another type of intersection.
Figure 6B:
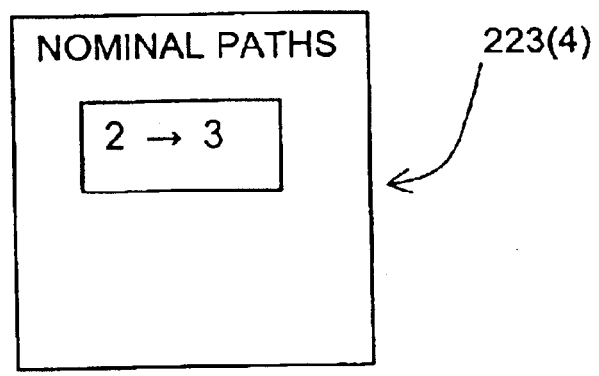
FIG. 6B is a diagram that illustrates the nominal path data included in a node data record that represents the intersection shown in FIG. 6A.

FIG. 6A shows an intersection 304. The intersection 304 is formed of an exit ramp from a controlled access road. The road segments that form the controlled access road are labeled H and J and the road segment that forms the exit ramp is labeled I. Travel along the road segments is restricted to the directions indicated by the arrows. A vehicle can continue along the controlled access road from H to J or exit the controlled access road from H to I. FIG. 6B shows the nominal path data 223(4) for the node data record that represents the intersection 304. The nominal path data 223(4) include only one path. In the case of the intersection 304, it is most likely that a person traveling along the controlled access road segment labeled H will travel straight to the road segment labeled J. Therefore, the nominal path is H to J. Data indicating this nominal path is included in the nominal path data 223(4) for the node data record that represents this intersection 304. In FIG. 6B, the arm number data are used to identify the entrance and exit segments of the nominal path.

EXAMPLE 4

Figure 7A:
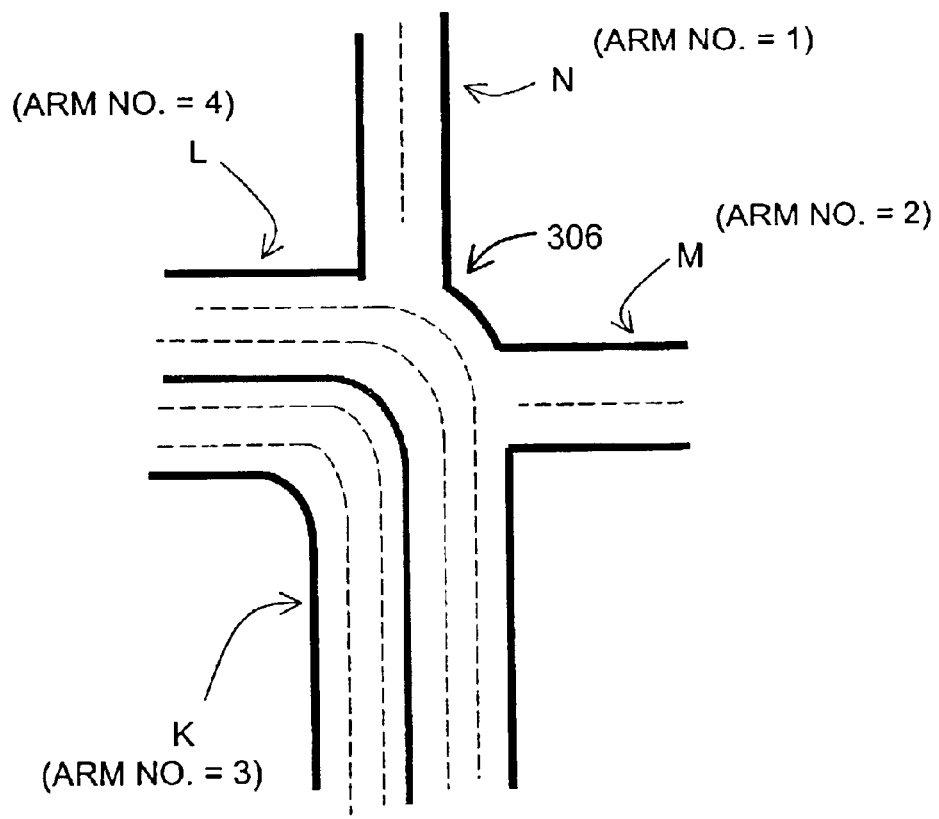
FIG. 7A is an illustration of yet another type of intersection.
Figure 7B:
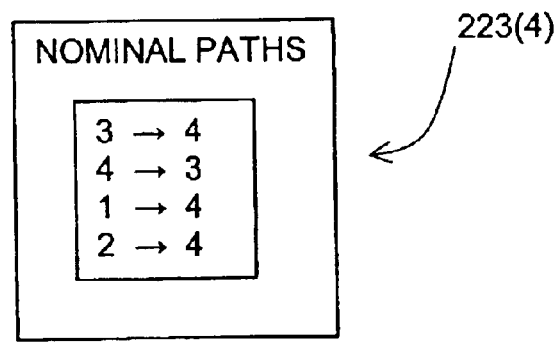
FIG. 7B is a diagram that illustrates the nominal path data included in a node data record that represents the intersection shown in FIG. 7A.

FIG. 7A shows an intersection 306. The road segments labeled K, L, M, and N all meet at the intersection 306. Travel in all directions is permitted on the road segments labeled K, L, M, and N. However, the road segments K and L are part of a higher functional class road than the road segments labeled M and N. For example, the road segments K and L may be part of a major business road and the road segments M and N may be minor roads. FIG. 7B shows the nominal path data 223(4) for the node data record that represents the intersection 306. The nominal path data 223(4) include four paths, one for each of the road segments along which travel to the represented node is permitted. In the case of the intersection 306, it is most likely that a person entering the intersection along the higher functional class road segment labeled K will continue traveling along the higher functional class road and therefore proceed onto to the higher functional class road segment labeled L. Likewise, a person entering the intersection along the higher functional class road segment labeled L is likely to continue traveling along the higher functional class road and therefore is likely to proceed onto to the higher functional class road segment labeled K. A person entering the intersection along the lower functional class road segment labeled M will likely proceed onto the higher functional class road and therefore travel onto the road segment labeled L. A person entering the intersection along the lower functional class road segment labeled N will likely proceed onto the higher functional class road. However, the turn onto the road segment labeled L is easier than proceeding straight onto the road segment labeled K. Therefore, the person entering the intersection along the road segment labeled N will likely turn onto the higher functional class road labeled L. Thus, the nominal paths are K to L, L to K, N to L, and M to L. Data indicating these nominal paths are included in the nominal path data 223(4) for the node data record that represents this intersection 306. In FIG. 7B, the arm number data are used to identify the entrance and exit segments of each nominal path.

EXAMPLE 5

Figure 8A:
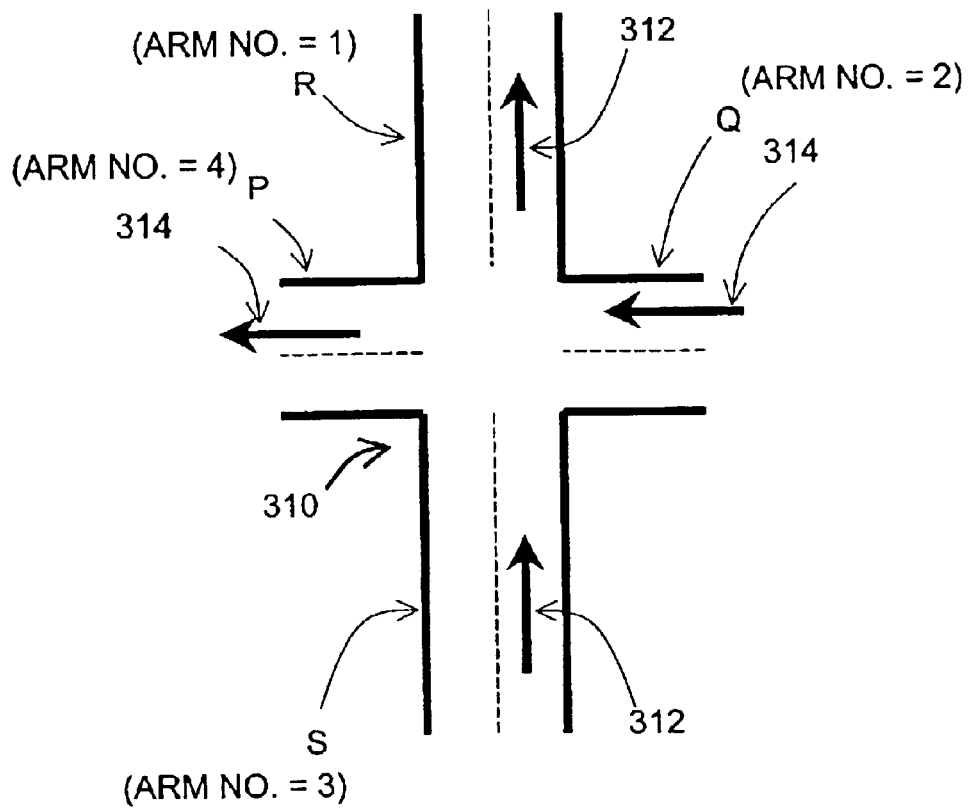
FIG. 8A is an illustration of a type of intersection.
Figure 8B:
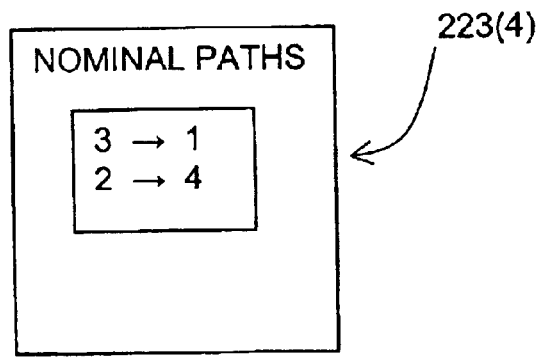
FIG. 8B is a diagram that illustrates the nominal path data included in a node data record that represents the intersection shown in FIG. 8A.

FIG. 8A shows an intersection 310. The road segments labeled P, Q, R, and S, all meet at the intersection 310. Travel in only one direction is permitted on the road segments labeled P, Q, R, and S, i.e., these road segments are part of intersecting one-way streets. Travel is permitted only in the directions of the arrows, 312 and 314. FIG. 8B shows the nominal path data 223(4) for the node data record that represents the intersection 310. The nominal path data 223(4) include two paths, one for each of the road segments along which travel to the represented node is permitted. In the case of the intersection 310, it is most likely that a person entering the intersection will travel straight through. Therefore, the nominal paths are S to R, and Q to P. Data indicating these nominal paths are included in the nominal path data 223(4) for the node data record that represents this intersection 310. In FIG. 8B, the arm number data are used to identify the entrance and exit segments of each nominal path.

There are various other types of intersections. Nominal paths can be defined for each type of intersection. In some instances, a most likely path cannot be determined, e.g., one exit segment is as likely as another. In such cases, one of the most likely exit road segments is selected for the nominal path of an entrance segment. When one exit road segment is as likely as another, a selection may be made based on road geometry, e.g., right turns preferred over left turns, etc.

II. Navigation System Platform

A. Overview

Figure 9:
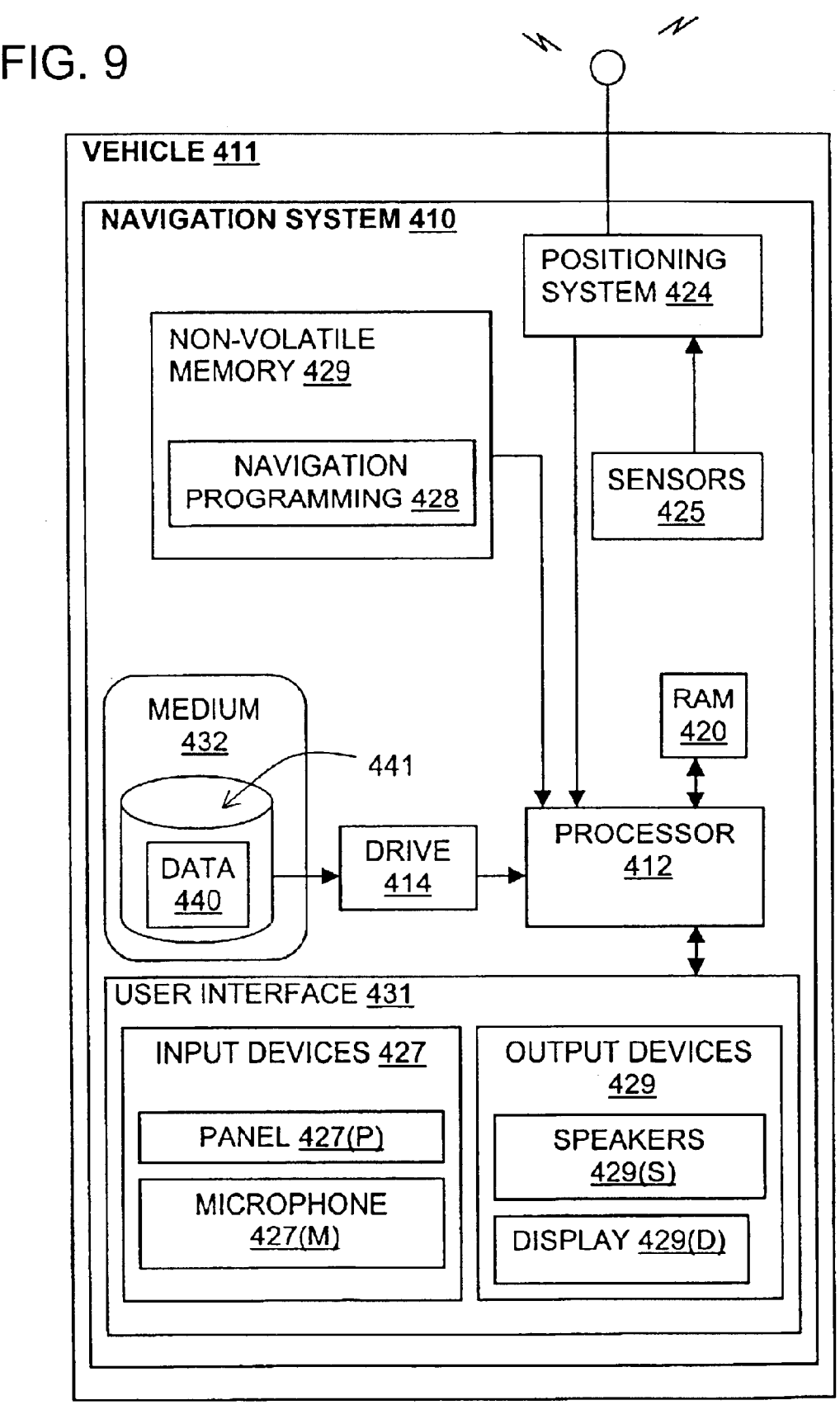
FIG. 9 is a block diagram showing a navigation system installed in a vehicle.

Referring to FIG. 9, there is a diagram illustrating an embodiment of a navigation system 410. The embodiment of the navigation system 410 shown in FIG. 9 uses nominal path data to represent routes.

In the embodiment shown in FIG. 9, the navigation system 410 is located in a vehicle 411, such as an automobile, truck, or bus. The navigation system 410 is a combination of hardware and software components. The hardware components of the navigation system 410 may include a processor 412, memory 420, and so on. In the embodiment of FIG. 9, the navigation system 410 also includes a positioning system 424 that determines the position of the vehicle 411 in which it is installed. The positioning system 424 may include sensors 425 or other components that sense the speed, orientation, direction, angular acceleration, and so on, of the vehicle 411. The positioning system 424 may also include a GPS system.

The navigation system 410 also includes a user interface 431. The user interface 431 includes appropriate means 427 for receiving instructions and/or input from an end user of the navigation system. The instruction receiving means 427 may include a touch screen, a keyboard, a keypad, or other type of input panel 427(P), a microphone 427(M), as well as other means for accepting end-user input, such as voice recognition software, and so on, through which the end user may request navigation information and services. The user interface 431 also includes appropriate means 429 for providing information back to the end user. The information providing means 429 may include a display 429(D) and speakers 129(S) (including speech synthesis hardware and software) through which the end user can be provided with information and services from the navigation system 410.

All of the components of the navigation system described above may be conventional (or other than conventional) and the manufacture and use of these components are known to those of skill in the art

B. The Geographic Database

In order to provide navigation features to an end user, the navigation system 410 uses geographic data 440. The geographic data 440 include information about one or more geographic regions or coverage areas. As an example, the geographic data 440 used by the navigation system 410 in FIG. 9 may correspond to some or all the geographic data 140 described in connection with FIGS. 2 and 3 that represent the geographic region 104 shown in FIG. 1.

Referring to FIG. 9, the geographic data 440 used by the navigation system 410 may be stored in the vehicle 411 or alternatively, the geographic data 440 may be stored remotely and made available to the navigation system 410 in the vehicle 411 through a wireless communication system which may be part of the navigation system 410. In another alternative, a portion of the geographic data 440 may be stored in the vehicle 411 and a portion of the geographic data 440 may be stored in a remote location and made available to the navigation system 410 in the vehicle 411 over a wireless communication system from the remote location.

In the embodiment shown in FIG. 9, some or all of the geographic data 440 are stored on a medium 432 which is located in the vehicle 411. Accordingly, the navigation system 410 includes a drive 414 (or other suitable peripheral device) into which the medium 432 can be installed and accessed. In one embodiment, the storage medium 432 is a CD-ROM disk. In another alternative embodiment, the storage medium 432 may be a PCMCIA card in which case the drive 414 would be substituted with a PCMCIA slot. Various other storage media may be used, including fixed or hard disks, DVD disks or other currently available storage media, as well as storage media that may be developed in the future.

The geographic data 440 include data specifying the positions of the roads in the covered geographic region(s). The geographic data 440 also include data relating to the roads, such as restrictions on directions of travel along the roads (e.g., one-way streets), street addresses along the roads, street names, speed limits along the roads, turn restrictions at intersections, and so on. The geographic data 440 may also include information about points of interest in the geographic area, such as hotels, restaurants, museums, stadiums, offices, automobile dealerships, auto repair shops, etc. The geographic data 440 may also include information about places, such as cities, towns, or other communities. The geographic data 440 may include other kinds of data about the geographic area.

The geographic data 440 are organized into one or more computer-readable data files or databases. Methods for forming and organizing a geographic database are disclosed in U.S. Pat. Nos. 5,953,722, 5,968,109, and 5,974,419, the disclosures of which are incorporated herein by reference. In one embodiment, the geographic data are provided by Navigation Technologies Corporation of Rosemont, Ill. However, it is understood that the inventive concepts disclosed herein are not restricted to any particular source of data.

One way that the accessing of geographic data can be enhanced for performing various navigation-related functions is to provide separate collections or subsets of the geographic data for use by the separate navigation-related functions performed by the navigation system. Each of these separate subsets is tailored specifically for use by a particular one or more of the navigation-related functions. Each subset of data includes only the data required to be used by a particular navigation-related function but excludes data that are not required for the particular function. For instance, when performing route calculation, information such as the speed along a road segment, turn restrictions from one road segment to another, and so on, are needed. However, route calculation does not necessarily require the name of the road to calculate a route. Similarly, when providing the map display function, some of the information associated with a road segment, such as the speed limits or turn restrictions, is not required. Instead, map display uses the portion of the geographic data that indicate the shapes and locations of roads, and possibly the names of the roads. Even further, when the route guidance function is being performed, some of the information, such as the speed and turn restrictions, is not required. Instead, when performing route guidance, information such as the names of roads, the address range along roads, signs along the roads, and so on, are used. Although there may be some overlap as to the types of information used by the various navigation-related functions, each of the navigation functions benefits from the resultant efficiency of handling smaller amounts of data thereby improving the overall performance of the navigation system.

Figure 10:
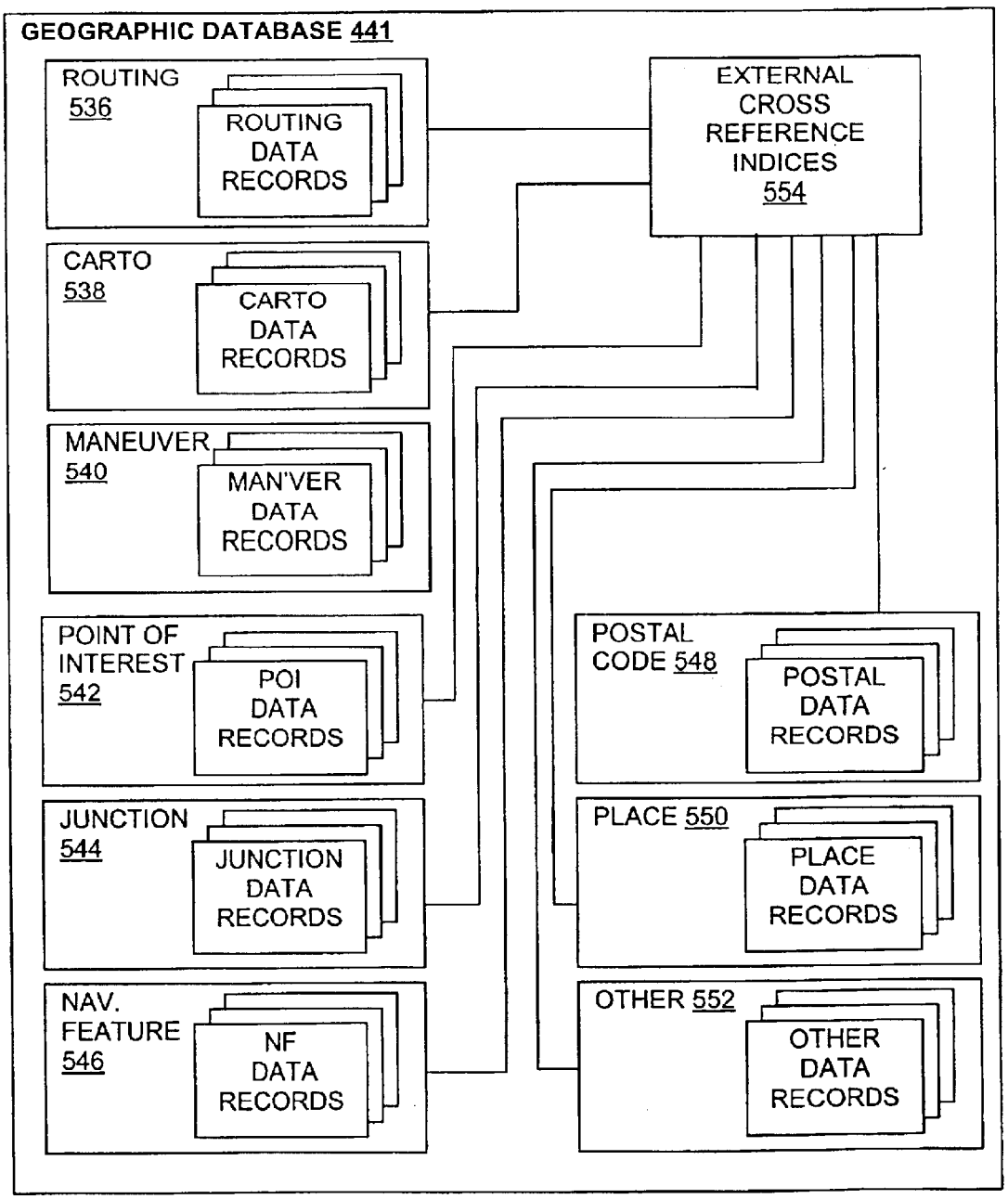
FIG. 10 is a diagram showing how the data are organized in the geographic database shown in FIG. 9.

FIG. 10 illustrates a diagram of the data contained in the geographic database 441. The geographic database 441 is comprised of separate subsets of data. The separate subsets include routing data 536, cartographic data 538 (for map display), maneuver data 540 (for route guidance), point-of-interest data 542 (for identifying specific points of interest, such as hotels, restaurants, museums, stadiums, airports, etc.), junction data 544 (for identifying named intersections), navigation feature name data 546 (identifying the actual names of roads and other geographic features), postal code data 548, and place data 550 (identifying administrative places, such as municipalities, states, counties, and so on). The geographic database 441 may also include data subsets for other types of data 552.

Providing for separate subsets of geographic data for each of the navigation functions also takes into account that usage of each of these navigation functions relates to the others of the functions in expected ways. For example, an end user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigation-related functions that use these different data subsets work together. To permit these data subsets to work together, the geographic database includes indices 554 that provide cross references, search trees, or other data finding techniques. Indices can be located within any of the subsets of data or external of any of the subsets.

C. The Navigation Programming

Referring again to FIG. 9, in addition to the hardware components and geographic database, the navigation system 410 includes or uses navigation programming 428. The navigation programming 428 includes the software that provides for the functions and/or features performed by the navigation system 410. The navigation programming 428 uses the geographic data 440 in conjunction with input from the end user via the user interface 431, and possibly in conjunction with outputs from the positioning system 424, to provide various navigation-related features and/or functions.

The navigation programming 428 may be stored in a non-volatile storage medium 429 in the navigation system 410. Alternatively, the navigation programming 428 and the geographic data 440 may be stored together on a single storage device or medium. Alternatively, the navigation programming 428 may be located at a remote location and may be provided to or accessed by the navigation system 410 over a communications system.

In one embodiment, the navigation programming 428 is written in the C programming language although in alternative embodiments other programming languages may be used, such as C++, Java, Visual Basic, and so on.

Figure 11:
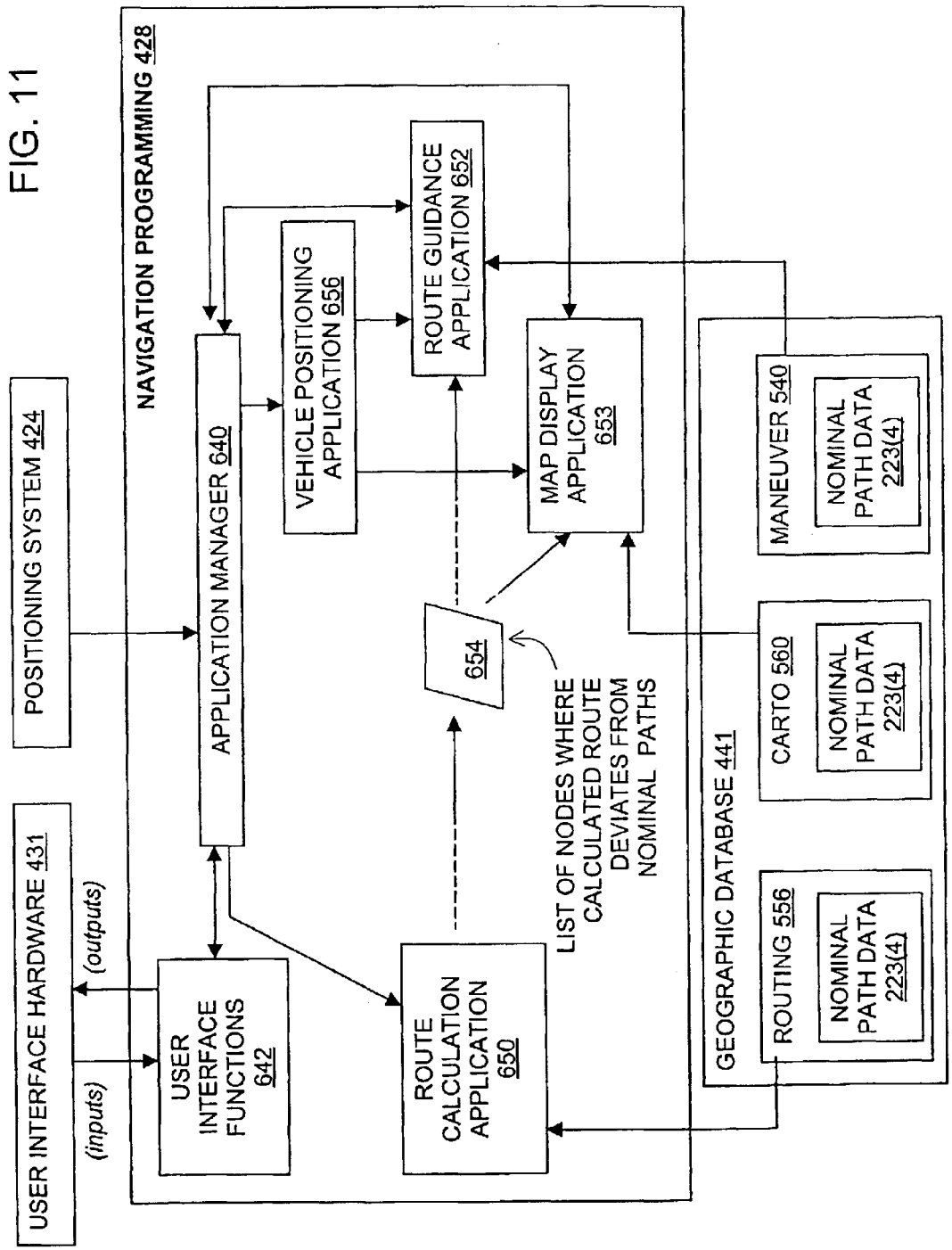
FIG. 11 is a diagram showing components of the navigation programming included in the navigation system of FIG. 9.

The navigation programming 428 may be formed of separate component applications (also referred to as programs, subprograms, routines, or tools). The component applications of the navigation programming 428 work together through defined programming interfaces. FIG. 11 shows a block diagram illustrating some of the component applications for one embodiment of the navigation programming 428 included in the navigation system 410 of FIG. 9. In addition to the component programs shown in FIG. 11, the navigation programming 428 may include other component sub-routines or programs.

In FIG. 11, the navigation programming 428 is shown to include a navigation application manager 640. The navigation application manager 640 is a program or routine that provides for overall management of the functions of the navigation system 410. The navigation application manager 640 may also include support for and interfaces to the navigation system hardware, such as the positioning system 424 and the user interface 431. The navigation programming 428 includes user interface functions 642 that interface with the navigation application manager 640 and that operate with the user interface hardware 431. These user interface functions 642 may provide for presenting a menu to the end user on the screen display 429(D) of the user interface hardware 431, accepting inputs from the end user via the input devices 427 of the user interface hardware 431, displaying results to the end user on the screen display 429(D) of the user interface hardware 431, and so on.

The navigation programming 428 includes sub-programs or routines that interface with the navigation application manager 640 and that provide for specific navigation-related features or functions to be performed by the navigation system. These subprograms include a route calculation application 650, a route guidance application 652, a map display application 653, and a vehicle positioning application 656. The navigation programming 428 may include other navigation applications in addition to these.

Methods for route calculation are disclosed in Ser. No. 09/047,698, filed Mar. 25, 1998, methods for providing route guidance are disclosed in Ser. No. 08/893,201, filed Jul. 15, 1997 and Ser. No. 09/196,279, filed Nov. 19, 1998, methods for providing vehicle positioning are disclosed in Ser. No. 09/276,377, filed Mar. 25, 1999, and methods for providing map display are disclosed in Ser. No. 09/047,141, filed Mar. 24, 1998 and Ser. No. 09/092,625, filed Jun. 5, 1998. The disclosures of these six patent applications are incorporated by reference herein. The methods disclosed in these patent applications represent only some of the ways that these functions can be provided and the subject matter claimed herein is not limited to any particular method. Any suitable method now known or developed in the future may be employed.

III. Using Nominal Path Data to Represent Routes

According to an embodiment, the navigation system uses geographic data that includes data indicating nominal paths through each node. These nominal path data can be used by a navigation system in several ways. One way that these nominal path data can be used by a navigation system is to represent routes.

A. Representing the Output of the Route Calculation Application

Referring to FIG. 11, when the route calculation application 650 determines a solution route to a desired destination, it provides an output 654. The output 654 is used by the route guidance application 652 to provide driving instructions to the vehicle driver to follow the route. The output 654 may also be used by other applications in the navigation system.

According to one embodiment, when forming the output 654 that represents the solution route, the route calculation application 650 uses the nominal path data (223(4) in FIG. 3). When the route calculation application 650 uses the nominal path data (223(4) to form an output that represents the solution route, the output is a compact representation of the solution route. An example of the data contained in the output 654 of the route calculation application is shown in FIG. 12.

Referring to FIG. 12, the output 654 includes data that represents the solution route calculated by the route calculation application 650. The output 654 includes data that identifies the origin and the destination of the solution route. The origin and destination can be identified in various different ways.

According to one embodiment, the origin can be identified by indicating the road segment upon which the origin is located and the destination can be identified by indicating the road segment upon which the destination is located. If the origin and destination are identified by the road segments upon which they are located, data indicating these road segments are included in the output 654 of the route calculation application. Road segment IDs (i.e., 222(1) in FIG. 3) may be used for this purpose.

According to another embodiment, the origin and destination can be identified by nodes (i.e., intersections). The origin can be identified by indicating that endpoint (i.e., node) of the road segment upon which the origin is located toward which a motorist should travel from the location of the origin in order to proceed along the solution route. The destination can be identified by that endpoint of the road segment upon which the destination is located through which the motorist should travel to reach the destination. According to this embodiment, node IDs (i.e., 223(1) in FIG. 3) can be used to represent the origin and destination in the solution route 654.

In another embodiment, the origin and destination are indicated using a locus data representation. According to this embodiment, a locus indicates a road segment (e.g., by segment ID), a position along the road segment (i.e., 50 meters from the left or right node, n/256$^{th}$ of the segment length from the left or right node, etc.), and a side (e.g., left or right side of the segment). Locus data representation is described further in U.S. Ser. No. 09/047,698. An advantage associated with using a locus data representation to indicate a position is that the position can be specified with more accuracy. In FIG. 12, the representation 654 of the solution route includes locus data indicating an origin 670 and locus data indicating a destination 672.

If the origin of a route is represented using locus data, data are included in the representation of the solution route to indicate which direction to go from the origin in order to proceed along the solution route. An initial exit identifier 673 can be used for this purpose. There are various ways to indicate which direction to proceed from the location of the origin. One way to indicate which direction to proceed is to indicate one of the endpoints of the road segment upon which the origin is located, and specifically that endpoint toward which the vehicle should travel from the locus of the origin in order to proceed along the solution route.

In FIG. 12, the representation 654 of the solution route includes an initial exit identifier 473. In this embodiment, the initial exit identifier 473 indicates the first node toward which to proceed from the origin in order to follow the solution route.

The output 654 may include one or more deviation locations 674. The deviation locations 674 indicate the locations (i.e., intersections) at which the solution route deviates from the nominal paths defined for the intersections. Each deviation location 674 indicates a deviation point 676 and an associated exit identifier 678. The deviation point 676 of a deviation location 674 identifies a node (i.e., intersection) at which the solution route departs from the nominal path through the node. The exit identifier 678 of a deviation location 674 identifies on which road segment to proceed from the node indicated in the associated deviation point 675 in order to continue along the solution route. There are various ways that can be used by the exit identifier 678 to indicate on which road segment to proceed from the deviation point node in order to continue along the solution route. One way is to indicate the arm number (i.e., 223(3)(1) in FIG. 3) of the exit segment. Other alternatives include using the road segment ID of the exit segment, the node ID of the node at the other end of the exit segment, or a compass direction (e.g., azimuth) of the exit road segment.

Figure 13A:
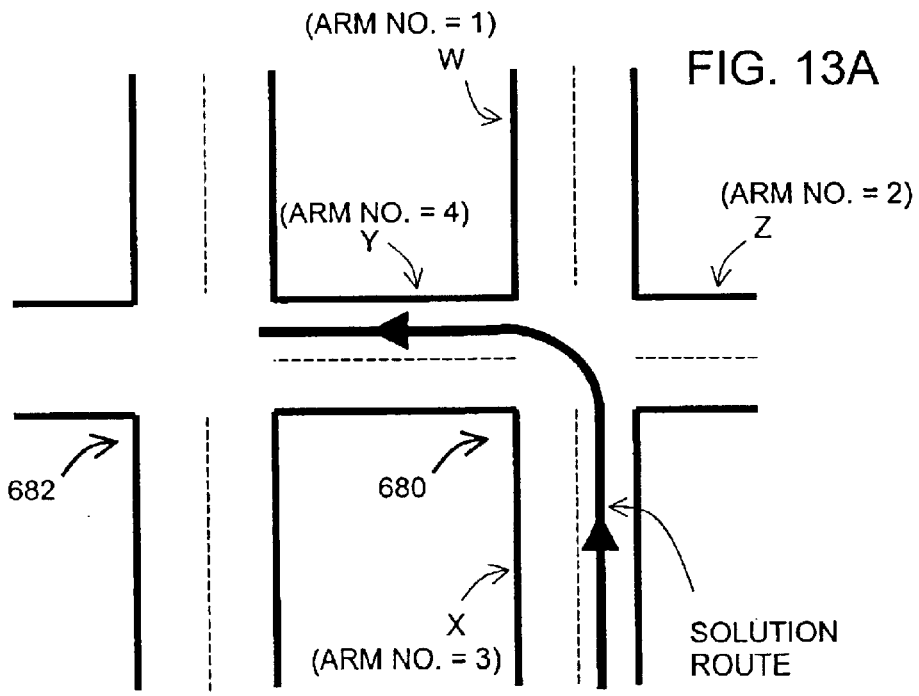
FIG. 13A is an illustration that depicts a portion of a route.
Figure 13B:
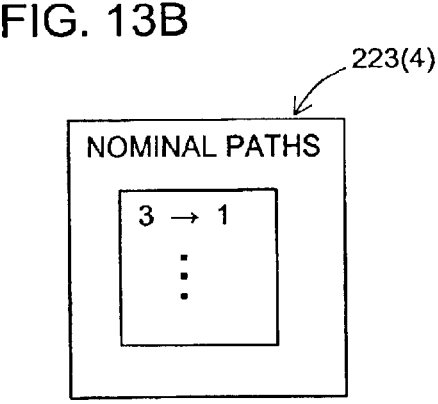
FIG. 13B is a diagram that illustrates nominal path data through one of the intersections shown in FIG. 13A.
Figure 13C:
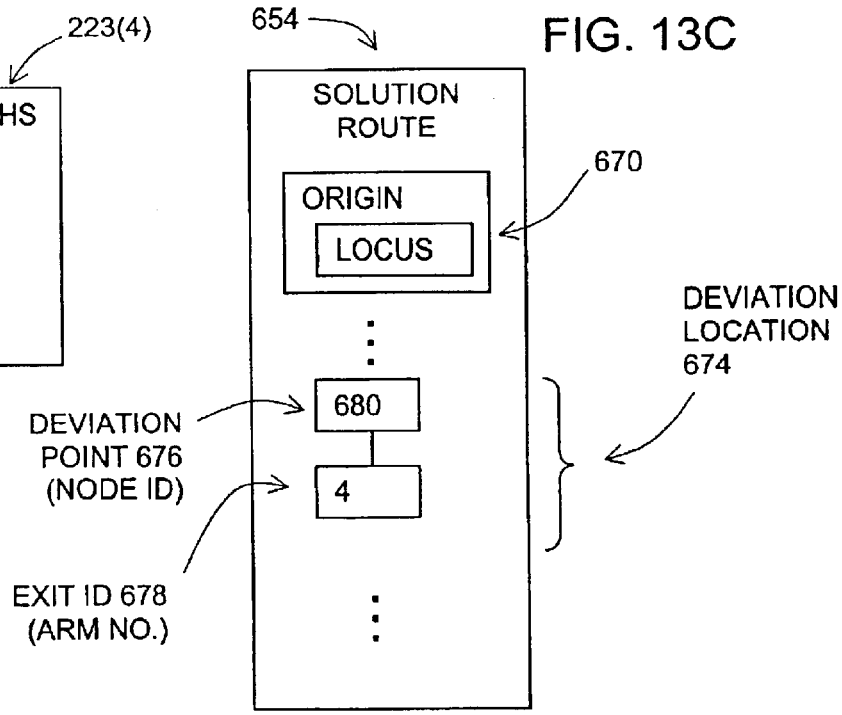
FIG. 13C is a diagram showing how the portion of the route shown in FIG. 13A is represented according to an embodiment.

An example is shown in FIGS. 13A, 13B, and 13C. In FIG. 13A, a solution route calls for making a left turn from segment X onto segment Y at an intersection 680. As shown in FIG. 13B, the nominal path data 223(4) through the intersection 680 from X calls for proceeding straight through onto segment W (i.e., arm number 3 to arm number 1). As shown in FIG. 13C, the output 654 of the route calculation application includes data indicating the deviation location 674. The data indicating the deviation location 674 includes data indicating the deviation point 676, i.e., the node ("680") at which the solution route deviates from the nominal path, and data indicating the exit identifier 678, i.e., the arm number ("4") of the exit segment from the node 680 to follow the solution route.

In order to form an output 654 that uses nominal path data to represent a solution route in a compact manner, the route calculation application 650 may calculate a solution route using any appropriate algorithm and then use the nominal path data to represent the solution route. The nominal path representation may be substituted for the list of segments representation after all the segments included in the solution route are identified or alternatively, the nominal path representation may be substituted for the list of segments representation as one or more segments are added to the solution route. As an example, if the route calculation application builds a solution route one segment at a time and if the segment being added is along the nominal path, then no addition is made to the representation of the solution route. However, if the segment being added is not along the nominal path, then data indicating a deviation location are added to the representation of the solution route.

When the route guidance application 652 receives the output 654 of the route calculation application 650, it uses the information in the output 654 to provide driving instructions to the navigation system user. In order to provide appropriate driving instructions, the route guidance application 652 analyzes each segment and intersection in the solution route to determine whether explication is appropriate and, if explication is appropriate, the type of explication to provide. In order to perform this function, the route guidance application uses the data in the output 654 of the route calculation application 650 to recreate the entire solution route, including all the segments and intersections in the solution route, from the output 654 that includes only the locations at which the solution route deviates from nominal paths.

In order to determine all the segments and intersections in the entire solution route from the data contained in the output 654 from the route calculation application, the route guidance application uses the nominal path data. As mentioned above, in one embodiment, the routing guidance application 652 uses the maneuver data subset 540 of the geographic database 440. According to this embodiment, the maneuver data subset 540 includes a set of the nominal path data. (According to this embodiment, both the routing data subset 556 and the maneuver data subset 540 include sets of the nominal path data 223(4), as shown in FIG. 11. In an alternative the routing data subset 556 and the maneuver data subset 560 share a single set of the nominal path data 223(4)). Even though the route guidance application 652 is required to recreate the entire solution route from the output 654 of the route calculation application that identifies only the locations at which the solution route deviates from the nominal paths, the route guidance application does not have to recreate the entire route all at once. Instead, the route guidance application can recreate only a portion of the entire solution route at a time from the route calculation application output 654. By recreating only a portion of the solution route at a time, the route guidance application can reduce the amount of memory needed to perform this function.

B. Representing a Route For Map Display

In the foregoing description, the route calculation application in a navigation system formed a compact representation of a solution route using nominal path data which was then used by the route guidance application to provide driving instructions for following the calculated route. The compact representation of a route formed by the route calculation application may be used by applications other than the route guidance application. As an example, the map display application may use the output of the route calculation application to highlight the calculated route on a map displayed on a display screen of the navigation system. If the route calculation application uses nominal path data to represent a calculated route in a compact manner, the map display application may recreate the solution route, including all the segments and intersections in the entire solution route, from the compact representation provided by the route calculation application in order to portray the solution route on the map being displayed.

The map display application uses nominal path data in order to perform this function. As described above in connection with FIG. 10, the map display application 653 uses the cartographic data subset 538 of the geographic database 440. According to the embodiment of the navigation system shown in FIG. 11, the cartographic data subset 538 includes a set of the nominal path data. (Alternatively, the cartographic data subset 538 and the routing data subset 556 may share a single set of the nominal path data 223(4)). Like the route guidance application 652, the map display application does not have to recreate the entire route all at once. Instead, the map display application can recreate only a portion of the entire solution route at a time from the route calculation application output 654 thereby limiting the amount of memory needed to perform this function.

C. Representing a Route For Wireless Transmission

The method for forming a compact representation of a route has been described in connection with a navigation system installed in a vehicle. The method for forming a compact representation of a route is not limited to any particular type of navigation system architecture. The method for forming a compact representation of a route can be used in various types of systems and architectures.

Figure 14:
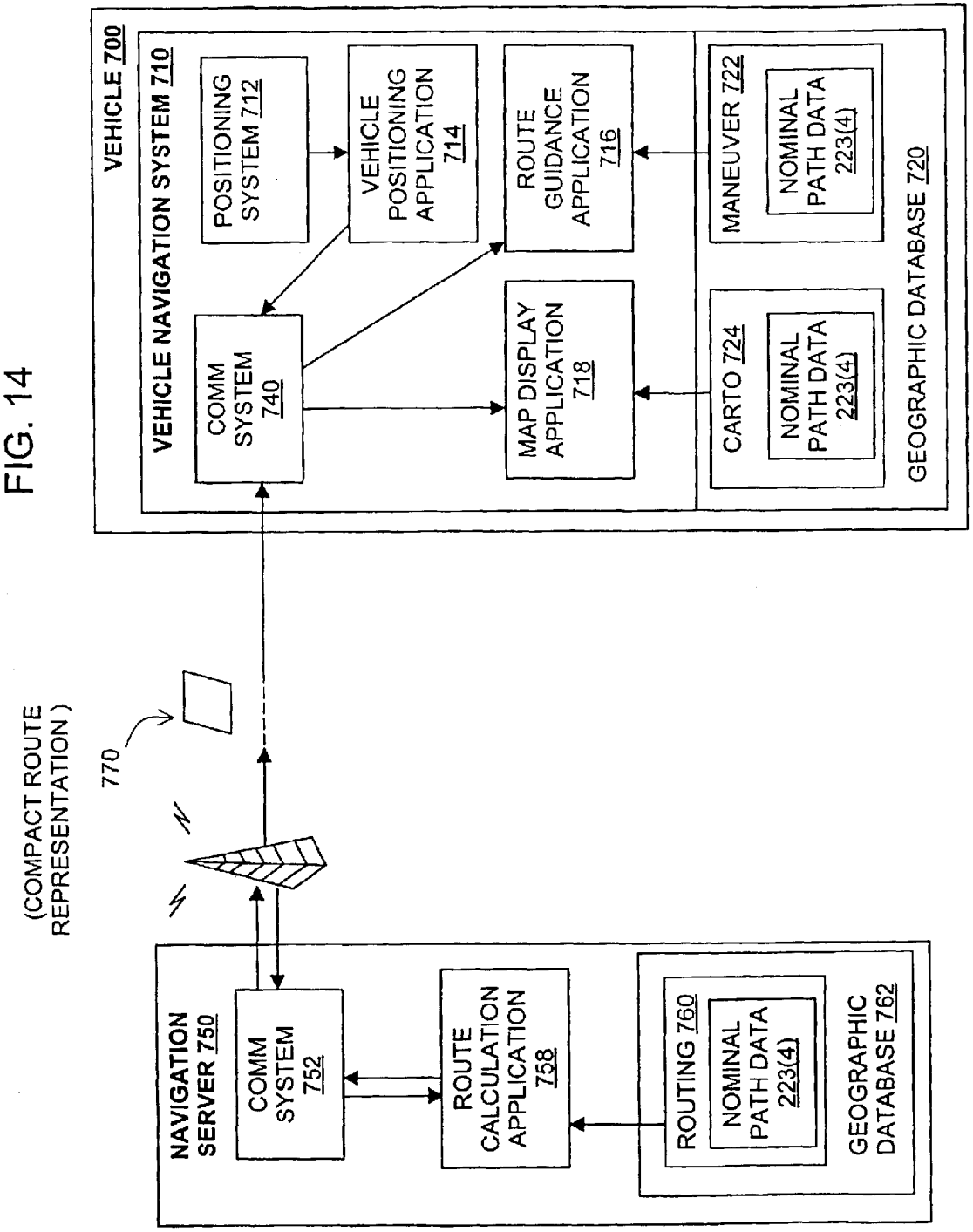
FIG. 14 is a block diagram showing an alternative embodiment of a navigation system that uses nominal path data.

In one type of navigation system architecture, a route is calculated at a central location and then data representing the calculated route are transmitted wirelessly to an in-vehicle navigation guidance system that provides the driver with instructions for following the route. The disclosed method for representing a route in a compact manner can be used with this type of navigation system. With a system in which data representing a route are transmitted wirelessly, a long route having a large number of road segments can be represented in a compact manner using the disclosed method. The disclosed method for representing routes provides advantages when used with this type of navigation system because it reduces the amount of data that has to be transmitted wirelessly. FIG. 14 illustrates a wireless transmission system that uses nominal path data to transmit compact representations of routes wirelessly.

In FIG. 14, a vehicle 700 includes a navigation system 710. The navigation system 710 is similar to the navigation systems described previously with the exception that the system 710 does not necessarily have a route calculation function provided locally. The navigation system 710 includes a positioning system 712, a vehicle positioning application 714, a route guidance application 716, and a map display application 718. These components perform functions that are similar to the like-named components described in connection with previous embodiments. The navigation system 710 includes a geographic database 720 that includes maneuvering data 722 and map display data 724. The maneuvering data 722 and the map display data 724 may include nominal path data 223(4), which define nominal paths through intersections located in a represented geographic region, as described above.

The navigation system 710 includes a communications system 740. The communications system 740 provides for the exchange of data between the navigation system 710 and a remotely located navigation server 750. The remotely located navigation server 750 includes a communications system 752 that allows the navigation server 750 to exchange data with the navigation system 710 in the vehicle 700. The navigation server 750 includes a route calculation application 758. The route calculation application 758 uses routing data 760 contained in a geographic database 762 associated with the navigation server 750.

When a user of the vehicle navigation system 710 wants to obtain route guidance to a destination, the navigation system 710 uses the communications system 740 to send a request to the navigation server 750 identifying an origin location and a desired destination. The navigation server 750 receives the request (via the server's communications system 752) and calculates the route using the route calculation application 758. The route calculation application 758 uses the routing data 760 located in the geographic database 762 associated with the navigation server 750. The server 750 sends data 770 representing the calculated route to the vehicle navigation system 710. The data 770 representing the calculated route are a compact representation formed using the nominal path data 223(4) associated with the geographic database 762 used by the navigation server 750. The vehicle navigation system 710 receives the compact representation 770 of the calculated route. The vehicle navigation system 710 uses the data received from the navigation server 750 to provide guidance to the user of the navigation system 710 for following the calculated route. As described above, when providing the route guidance, the vehicle navigation system 710 may recreate the entire solution route, including all the road segments and intersections contained therein. In order to recreate the entire solution route, the vehicle navigation system 710 uses nominal path data 223(4) included in the geographic database 720 included locally with the vehicle navigation system 710.

D. Using Nominal Path Data For Route Calculation

In the embodiments described above, a route calculation application calculates a solution route to a destination and then provides a data representation of the calculated route to another application (e.g., the route guidance application or the map display application) in order that the other application can provide some navigation-related function to an end user (e.g., provide driving directions, display a map, and so on). In the embodiments described above, the route calculation application may have the capability to optimize the calculated route for specific criteria. For example, the route calculation application can calculate the fastest route, the shortest route, the route that minimizes tolls, etc. According to another embodiment, the route calculation application can use the nominal path data when calculating a route. According to this embodiment, the route calculation application can use the nominal path data to minimize departures from nominal routes when calculating a solution route. A route calculated in this manner may be better because it may tend to follow the actual paths that drivers would most likely travel. A route calculated in this manner may be better than a route that minimizes travel time because it may more accurately reflect drivers' preferred driving patterns.

IV. Advantages

The use of nominal path data to represent routes provides advantages over prior ways to represent routes. The use of nominal path data to represent routes has advantages for systems that have limited resources. The use of nominal path data to represent routes has advantages for systems that transmit route data wirelessly.

It is intended that the foregoing detailed description be regarded as illustrative rather than limiting and that it is understood that the following claims including all equivalents are intended to define the scope of the invention.

I claim:

1. A database that represents geographic features located in a region, the database comprising:

data representations of intersections of roads located in the region; and for each data representation of an intersection, data that indicate road segments that meet at the intersection; and data that indicate nominal paths through the intersection, wherein said data that represent nominal paths associate each entrance road segment into the intersection with one, and only one, exit road segment.

2. The invention of claim 1 further comprising:

for each data representation of an intersection, data that indicate the geographic coordinates of the intersection.

3. The invention of claim 1 wherein the exit road segment associated with an entrance road segment is that road segment onto which a motorist is most likely to travel from the entrance road segment.

4. The invention of claim 1 wherein the data that indicate road segments that meet at the intersection indicate, for each road segment into the intersection, each road segment from which the intersection can be exited.

5. A database that represents geographic features located in a region, the database comprising:

data representations of intersections of roads located in the region;

successor data that indicate, for each entrance road segment along which a represented intersection can be entered, each successor road segment from which the intersection can be exited; and in addition to said successor data, nominal path data that indicate, for each entrance road segment, one, and only one, of the successor road segments associated with the entrance road segment.

6. The invention of claim 5 wherein the successor data indicate which successor road segments associated with an entrance road segment can be entered legally.

7. The invention of claim 5 wherein the successor road segments associated with an entrance road segment indicate all road segments that connect to the entrance road segment including any road segment that can be entered legally from the entrance road segment and any road segment that connects to, but cannot legally be entered from, the entrance road segment.

8. The invention of claim 5 further comprising:

for each data representation of an intersection, data that indicate the geographic coordinates of the intersection.

9. The invention of claim 5 wherein the exit road segment associated with an entrance road segment by the nominal path data is that road segment onto which a motorist is most likely to travel from the entrance road segment.

* * * * *